United States Patent [19]

Aspden

[11] Patent Number: 4,655,997
[45] Date of Patent: Apr. 7, 1987

[54] NUCLEAR REACTOR CONSTRUCTIONS

[75] Inventor: Garth J. Aspden, Bolton, England

[73] Assignee: National Nuclear Corporation Limited, London, England

[21] Appl. No.: 555,012

[22] Filed: Nov. 25, 1983

[30] Foreign Application Priority Data

Dec. 3, 1982 [GB] United Kingdom ............... 8234508

[51] Int. Cl.$^4$ .............................................. G21C 9/00
[52] U.S. Cl. .................................................. 376/289
[58] Field of Search ............... 376/287, 289, 290, 295, 376/404; 52/410; 248/317, 348; 403/121; 411/538

[56] References Cited

U.S. PATENT DOCUMENTS

| | | | |
|---|---|---|---|
| 2,837,477 | 6/1958 | Fermi et al. | 376/287 |
| 2,942,115 | 6/1960 | O'Connell | 376/287 |
| 3,119,744 | 1/1964 | McLain | 376/287 |
| 4,292,134 | 9/1981 | Eriksson | 376/289 |
| 4,324,619 | 4/1982 | Guerin | 376/290 |

FOREIGN PATENT DOCUMENTS

| | | | |
|---|---|---|---|
| 2843715 | 4/1979 | Fed. Rep. of Germany | 403/121 |
| 1092487 | 4/1955 | France | 411/538 |
| 2315055 | 1/1977 | France | 376/290 |
| 926006 | 5/1963 | United Kingdom | 376/290 |
| 1394323 | 5/1975 | United Kingdom . | |
| 1468182 | 3/1977 | United Kingdom . | |
| 1489661 | 10/1977 | United Kingdom . | |

Primary Examiner—Deborah L. Kyle
Assistant Examiner—Richard W. Wendtland
Attorney, Agent, or Firm—William R. Hinds

[57] ABSTRACT

The combination in a nuclear reactor of a concrete containment and thermal insulation for the roof of the containment, the thermal insulation being secured to the roof by hangers each of which has a linkage connector at its upper end by means of which it is secured to the roof, the linkage connector permitting movement of the hanger in two dimensions, and means at the lower end of each hanger serving to support the thermal insulation from beneath and permitting lateral movement of the insulation in two dimensions.

3 Claims, 3 Drawing Figures

NUCLEAR REACTOR CONSTRUCTIONS

BACKGROUND OF THE INVENTION

This invention relates to nuclear reactors in which a nuclear fuel assembly is contained in a concrete containment. One example of nuclear reactor of this description is a liquid metal cooled fast reactor. Another is a gas-cooled nuclear reactor of either the fast or thermal variety. In the case of the former, a nuclear fuel assembly is disposed in a liquid metal containing primary vessel which is housed in a concrete containment vault, heat being transferred from the fuel to the liquid metal and from thence to steam generators via intermediate heat exchangers. In the case of the latter, a nuclear fuel assembly is supported within a prestressed concrete pressure vessel and gaseous coolant is circulated between fuel assembly and steam generators to transfer heat thereto. In both cases it is necessary to provide thermal insulation to protect the concrete. In the former example, the concrete of the roof of the vault as well as that of the vault sides and base needs to be protected. In the latter example, the concrete of the roof of the pressure vessel as well as that of the wall and floor, requires protection. This invention is concerned with such roof insulation and not with the insulation of walls or base of concrete vault or pressure vessel as the case may be. Such thermal insulation is generally suspended from the appropriate roof by hangers or tie rods, and various proposals have been made for compensating for the changes in dimensions of the insulation as temperature-dictated expansion and contraction, depending on the state of operation of the reactor, occur. One proposal has been to provide both upper and lower ends of the hangers or tie rods with spherical bearings or seatings, but these are liable to stick and then unacceptable straining of insulation and/or hangers or tie rods can occur which can result in insulation becoming detached from the roof.

It is an object of the present invention to provide a construction for the securing of heat insulation to a concrete roof structure which is less liable to damage as aforesaid.

FEATURES AND ASPECTS OF THE INVENTION

According to the invention, the roof of a concrete containment or pressure vessel of a nuclear reactor has thermal insulation secured to it by hanging therefrom, through the medium of a plurality of hangers, wherein each hanger is secured to the said roof by a linkage connection at its upper end and which permits movement of the hanger in two dimensions, and the other end of each hanger being adapted to support the thermal insulation from beneath by means which permit lateral movement of the insulation in two dimensions.

The said linkage connection may comprise an eye or hook on the said roof for engagement with an eye or hook constituting the said upper end of the respective hanger. Thus combinations involving double hook, or double eye, or eye and hook, or hook and eye, are all envisaged.

Preferably according to the invention, in a nuclear reactor having a roof, depending hangers supported at the upper ends thereof from the roof by hook and eye type connections to allow two dimensional movement of the hangers, and thermal insulation located under the roof and defining apertures through which the hangers extend to support the insulation, there is provided the improvement comprising a support assembly at a lower end of each hanger, the assembly comprising a first element about the hanger and defining a first one dimensional ridge at the upper end of the first element, the first ridge engaging the underside of the insulation to support the insulation and being pivotal on the insulation, a second element about the hanger and below the first element, a second one dimensional ridge at the upper end of the second element to allow relative pivotal movement between the first element and the second element, means for aligning the first element and the second element such that the first ridge and the second ridge are aligned at substantially 90° with respect to each other, and securing means for retaining the first element and the second element on the hanger.

DESCRIPTION OF THE DRAWINGS

A constructional embodiment of the invention will now be described by way of example with reference to the accompanying drawings, wherein.

DESCRIPTION OF THE PREFERRED EMBODIMENT

Figure 1:
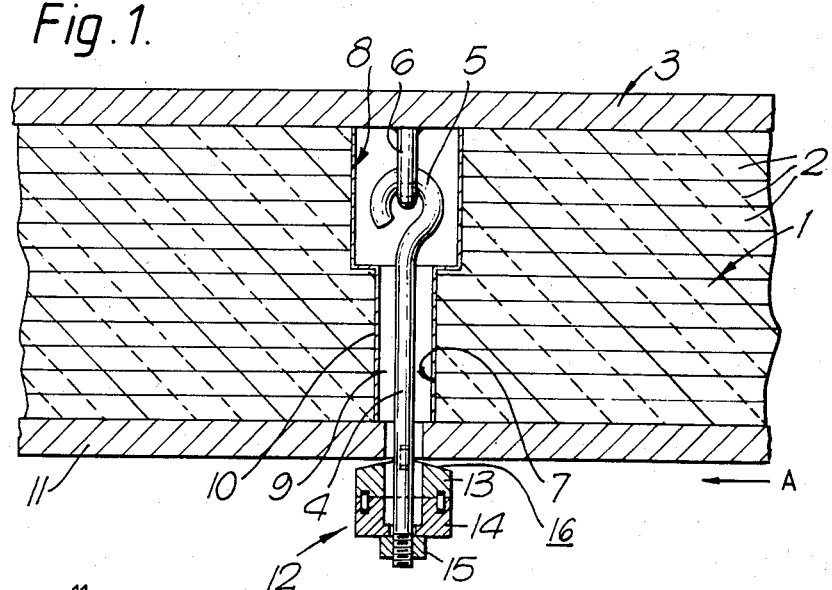
FIG. 1 is a side view partly in medial section of a part of roof insulation according to the invention.
Figure 3:
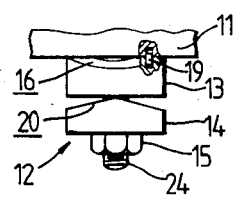
FIG. 3 is a fragmentary view in the direction of arrow A of FIG. 1.
Figure 2:
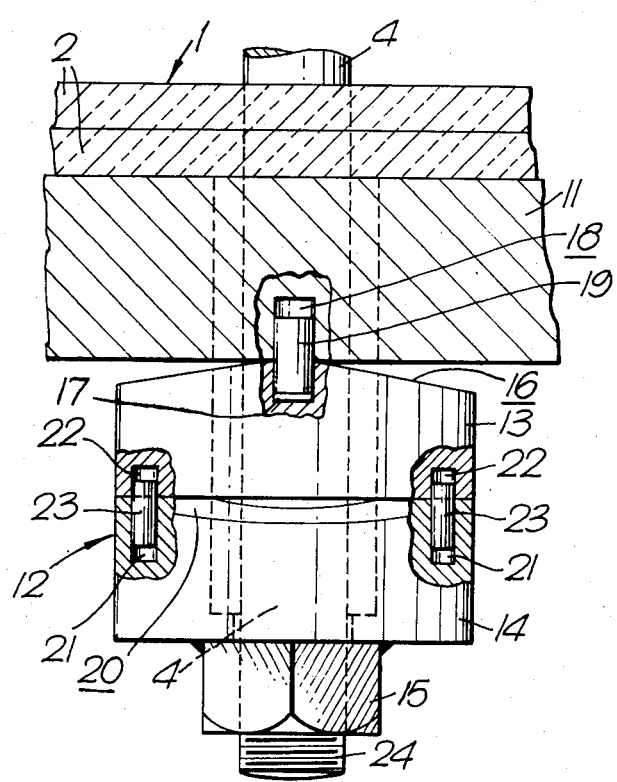
FIG. 2 is an enlarged side view of a detail of FIG. 1.

Referring to the drawings, there is illustrated in diagrammatic and fragmentary manner an embodiment of thermal insulation, designated generally 1 and typically consisting of a pack of elements 2, mounted on the roof of a vault or concrete pressure vessel, the reference numeral 3 indicating either the concrete itself or a metallic membrane lining the concrete, as appropriate to the design of nuclear reactor involved. The mounting is effected by a plurality of hangers, one being shown in the drawings, designated 4. Each hanger 4 is elongate, is of metal, preferably of circular cross-section, and has a hooked end 5 engageable with an eye 6 which can be part of an eyebolt embedded in the concrete or is welded to the said membrane. In alternatives, not shown, the hooked end 5 can be formed as an eye and engaged with the eye 6, or the eye 6 can instead be a hook and be engaged either with the hooked upper end 5 of a hanger 4 or with an eye constituting the said upper end. All four alternatives give freedom for each hanger 4 to move in two dimensions in a pivotal manner.

The thermal insulation 1 has a number of apertures 7 one for each hanger 4, consisting of a part 8 of larger diameter to provide clearance for the hook/eye or alternatives, and a part 9 of smaller diameter to accommodate the intermediate part of the respective hanger 4. A lining 10 for the parts 8 and 9 is included. The aperture 7 also extends through a casing 11 which forms the lower extremity of the thermal insulation 1. The latter is advantageously provided in separate, adjoining units (not shown) with overlapping or interleaving to avoid radiation shine and hot spots.

The lower end of each hanger 4 carries a composite assembly 12 composed of three elements 13, 14, 15 respectively. The purpose of the composite assembly 12 is to retain the thermal insulation on the roof in a manner which avoids undue straining when ambient temperature varies, as will happen during different operational states of the nuclear reactor, including shut-down, normal operation for power generation (when the ambient temperature may vary over a relatively small range depending on reactor power or loading) and fault conditions. The element 13 is hollow cylindrical with a ridge 16 in one dimension and with opposed holes 17 across the ridge 16 and corresponding with holes 18 in the casing 11, there being a dowel pin 19 engaging each pair of holes 17, 18 and extending between element 13 and casing 11. Beneath element 13 is disposed the element 14 which is another hollow cylindrical element having a one dimensional ridge 20, opposed holes 21 across the ridge 20 and aligned with holes 22 in the lower part of element 13, and dowel pins 23 engaging the holes 21, 22 and extending between elements 13 and 14. The ridge 16 is 90° offset from ridge 20, and each hole pair 17, 18 is disposed 90° offset from each hole pair 21, 22 as can be appreciated from the drawings. The third element of each composite assembly 12 is a nut 15 engaging a screwthread 24 at the lower end of the respective hanger 4 and serving to hold the composite assembly in operative position both axially and angularly such that the ridge 16 engages that part of casing 11 which surrounds the respective aperture 7, the ridge 20 engages the lower surface of element 13, and consequently the dowel pins 19, 23 are retained in their respective hole pairs. The nut 15 can be welded in its operative position as shown.

Each composite assembly 12 enables the insulation 1 to move laterally whilst avoiding any tilting thereof, as dictated by thermal expansion or contraction. The ability of the insulation to move laterally without tilting avoids straining of the insulation, this contributing significantly to its ability to fulfil its design life in trouble-free manner.

I claim:

1. In a nuclear reactor having a roof, depending hangers supported at upper ends thereof from said roof by hook and eye type connections to allow two dimensional movement of the hangers, and thermal insulation located under the roof and defining apertures through which the hangers extend to support said insulation, wherein the improvement comprises, each hanger comprising a rigid tie-rod having a said hook and eye type connection at its upper end, a support assembly at a lower end of each tie-rod, said assembly comprising a first element about the tie-rod and defining a first one dimensional ridge at the upper end of the first element, which first ridge engages the underside of the insulation to support the insulation and being pivotal on the insulation, a second element about the tie-rod and below the first element, a second one dimensional ridge at the upper end of the second element for allowing relative pivotal movement between the first element and the second element, means for aligning the first element and the second element such that the first ridge and the second ridge are aligned at substantially 90° with respect to each other, and securing means for retaining the first element and the second element on the tie-rod.

2. An assembly as claimed in claim 1, wherein the aligning means comprises a first pair of pins protruding from the first ridge and locating in respective opposed holes in the insulation, and a second pair of pins protruding from the second ridge defined by the second element and locating in respective opposed holes in the first element.

3. An assembly as claimed in claim 1 wherein said first element includes a passage through which said tie-rod passes with clearance, and said securing means secures said second element to the tie-rod such that said first element is retained by engagement with the underside of the insulation by said first ridge and by engagemenet of said second ridge with the lower end of said first element.

* * * * *